United States Patent
Kumar et al.

(10) Patent No.: US 10,995,255 B2
(45) Date of Patent: May 4, 2021

(54) METHOD OF INHIBITING WATER PENETRATION INTO OIL- AND GAS-PRODUCING FORMATIONS

(71) Applicant: Momentive Performance Materials, Inc., Waterford, NY (US)

(72) Inventors: Mukesh Kumar, White Plains, NY (US); Kalman Koczo, Suffern, NY (US); Mark Leatherman, Stamford, CT (US); Kostas Spyropoulos, Mies (CH)

(73) Assignee: Momentive Performance Materials Inc., Waterford, NY (US)

( * ) Notice: Subject to any disclaimer, the term of this patent is extended or adjusted under 35 U.S.C. 154(b) by 9 days.

(21) Appl. No.: 16/282,476

(22) Filed: Feb. 22, 2019

(65) Prior Publication Data
US 2019/0270927 A1    Sep. 5, 2019

(30) Foreign Application Priority Data
Mar. 1, 2018  (EP) ..................... 18159515

(51) Int. Cl.
| | |
|---|---|
| *C09K 8/50* | (2006.01) |
| *C09K 8/508* | (2006.01) |
| *C09K 8/518* | (2006.01) |
| *C09K 8/88* | (2006.01) |
| *C09K 8/68* | (2006.01) |
| *C08K 5/5419* | (2006.01) |
| *C08L 83/04* | (2006.01) |

(52) U.S. Cl.
CPC ............ *C09K 8/5086* (2013.01); *C09K 8/508* (2013.01); *C09K 8/518* (2013.01); *C09K 8/68* (2013.01); *C09K 8/88* (2013.01); *C08K 5/5419* (2013.01); *C08L 83/04* (2013.01)

(58) Field of Classification Search
None
See application file for complete search history.

(56) References Cited

U.S. PATENT DOCUMENTS

| | | | |
|---|---|---|---|
| 3,682,831 A | 8/1972 | Tate | |
| 5,325,920 A | 7/1994 | Djabbarah | |
| 5,465,792 A | 11/1995 | Dawson et al. | |
| 5,701,956 A | 12/1997 | Hardy et al. | |
| 6,109,350 A | 8/2000 | Nguyen et al. | |
| 6,201,058 B1 | 3/2001 | Mahr et al. | |
| 6,206,102 B1 * | 3/2001 | Pusch | C09K 8/5086 166/305.1 |
| 6,364,020 B1 | 4/2002 | Crawshaw et al. | |
| 6,516,885 B1 | 2/2003 | Munday | |

(Continued)

FOREIGN PATENT DOCUMENTS

| | | |
|---|---|---|
| CN | 103936998 A | 7/2014 |
| WO | 2013049235 A1 | 4/2013 |
| WO | 2015020656 A1 | 2/2015 |

OTHER PUBLICATIONS

European Search Report and European Written Opinion from corresponding EP 18159515.8 completed Jul. 25, 2018.

*Primary Examiner* — Jeffrey D Washville
(74) *Attorney, Agent, or Firm* — Joseph S. Ostroff

(57) ABSTRACT

Water penetration into a siliceous subterranean hydrocarbon fluid-bearing formation is inhibited by introducing into the formation organosiloxane possessing at least one alkoxy group directly bonded to a silicon atom.

15 Claims, 1 Drawing Sheet

Amount of Crude Oil Passed by Wicking

(56) References Cited

U.S. PATENT DOCUMENTS

| | | | |
|---|---|---|---|
| 6,913,081 B2 | 7/2005 | Powell et al. | |
| 7,008,908 B2 | 3/2006 | Chan et al. | |
| 7,196,040 B2 | 3/2007 | Heath et al. | |
| 7,431,089 B1 | 10/2008 | Couillet et al. | |
| 7,589,048 B2 | 9/2009 | Eoff et al. | |
| 7,595,283 B2 | 9/2009 | Eoff et al. | |
| 7,858,563 B2 | 12/2010 | Hughes et al. | |
| 7,977,445 B2 | 7/2011 | Hattemer et al. | |
| 8,016,039 B2 | 9/2011 | Hodgins et al. | |
| 8,420,576 B2 | 4/2013 | Eoff et al. | |
| 8,765,647 B2 | 7/2014 | Kilaas et al. | |
| 8,795,784 B2 | 8/2014 | Standke et al. | |
| 8,985,212 B1 | 3/2015 | Crespo et al. | |
| 2004/0023818 A1 | 2/2004 | Nguyen et al. | |
| 2004/0177957 A1 | 9/2004 | Kalfayan et al. | |
| 2006/0065396 A1 | 3/2006 | Dawson et al. | |
| 2007/0204990 A1* | 9/2007 | Kotlar | C09K 8/5755 166/276 |
| 2008/0187673 A1* | 8/2008 | Standke | C08J 3/03 427/421.1 |
| 2009/0093382 A1 | 4/2009 | Brannon et al. | |
| 2009/0275489 A1* | 11/2009 | Kilaas | C09K 8/565 507/209 |
| 2010/0147515 A1 | 6/2010 | Hughes et al. | |
| 2010/0163234 A1 | 7/2010 | Fuller et al. | |
| 2011/0114314 A1 | 5/2011 | Wang et al. | |
| 2012/0208728 A1 | 8/2012 | Fleming et al. | |
| 2013/0081812 A1 | 4/2013 | Green et al. | |
| 2015/0068755 A1 | 3/2015 | Hill et al. | |

* cited by examiner

Figure 1. Amount of Crude Oil Passed by Wicking
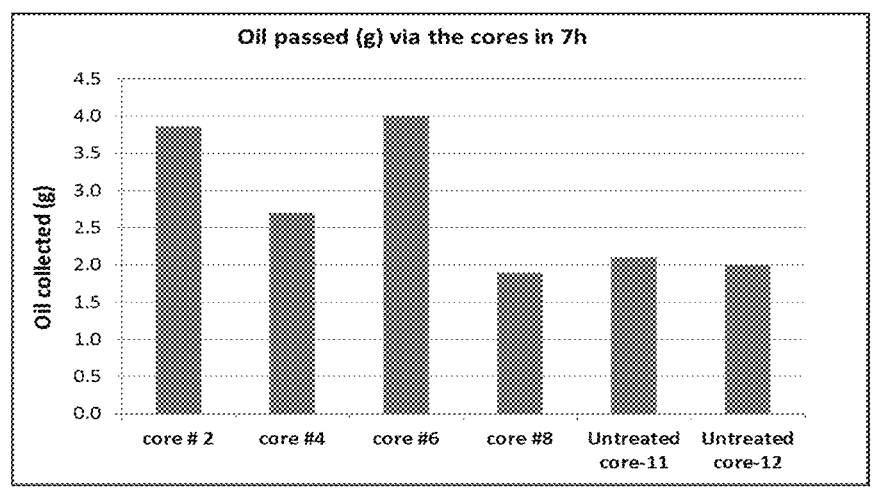
Figure 2. Picture Showing the Wicking Process
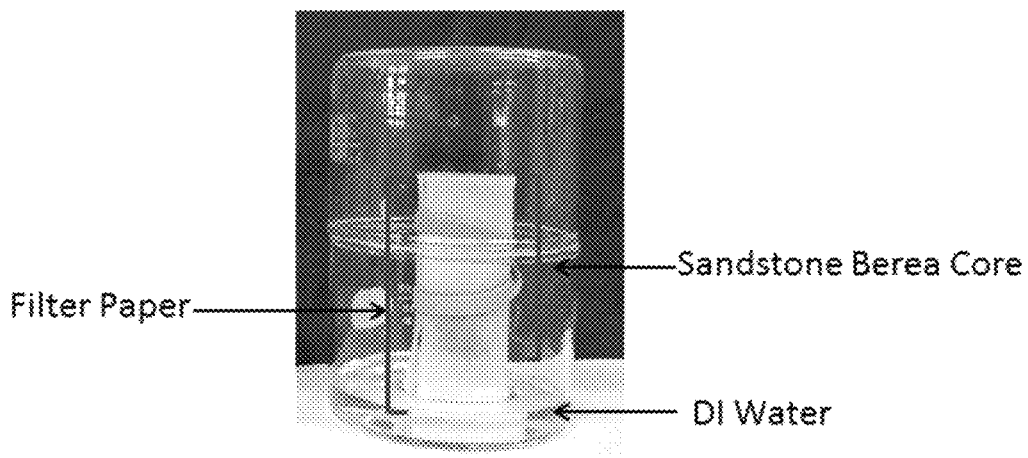

METHOD OF INHIBITING WATER PENETRATION INTO OIL- AND GAS-PRODUCING FORMATIONS

BACKGROUND OF THE INVENTION

The present invention relates to a method for treating subterranean formations. More particularly, the invention is directed to a method for inhibiting water penetration into oil- and gas-producing formations.

Penetration or seepage of water from water-bearing sections within or adjacent to hydrocarbon-bearing subterranean formations can negatively affect the recovery of hydrocarbons (gas and oil) therefrom. The production of water can significantly increase the cost of recovery due to the expense of separating the water from the hydrocarbons.

The problem of water production can be particularly acute where a subterranean formation contains significant quantities of soluble salts and minerals, for example, halides, which can dissolve in water that has penetrated into the gas/oil-producing formation. Upon evaporation of the water, salts will settle out and deposit within fissures, fractures and porous structures within the formation, thereby reducing its permeability and increasing its resistance to the flow of hydrocarbon fluids.

A variety of approaches have been proposed to deal with the problem of water penetration into oil and gas formations. Such approaches may involve water shut-off treatment and/or alteration of the permeability of the formation. Several related procedures center around the introduction of organic polymers of various kinds into a subterranean formation whereby its permeation characteristics are beneficially modified. Other methods utilize water shut-off (WSO) compositions or gels to minimize or decrease the flow of water from nearby water-producing layers, sections or zones. However, challenges remain with these approaches due to thermal and/or chemical decomposition of the treatment materials, their pH sensitivity, susceptibility to syneresis, incompatibility with rock surfaces and/or other factors tending to militate against their practical implementation.

SUMMARY OF THE INVENTION

In accordance with the present invention, a method is provided for inhibiting penetration of water from a water-producing layer, section or zone located within, near or adjacent to a siliceous subterranean hydrocarbon fluid-bearing formation into such formation which comprises introducing into the formation a water penetration-inhibiting amount of a water penetration-inhibiting composition comprising an organosiloxane possessing at least one alkoxy group directly bonded to a silicon atom, the organosiloxane reacting with the siliceous formation to decrease its hydrophilic character and increase its hydrophobic character thereby inhibiting the penetration of water into the hydrocarbon fluid-containing formation.

Following its introduction into the hydrocarbon-bearing formation, the organosiloxane undergoes reaction with hydroxyl groups present on the surface of siliceous material within the formation thereby chemically bonding the organosiloxane thereto and rendering the formation more hydrophobic. Since the organosiloxane-modified siliceous material is innately hydrophobic, water that would otherwise penetrate into the hydrocarbon-bearing formation is less likely to do so and will preferentially seek a flow route which is less hydrophobic and therefore away from the hydrocarbon-bearing formation. In this manner, the formation can be made more resistant to the penetration of water into its oil/gas-producing regions thereby increasing oil/gas production and decreasing water production.

Another embodiment of the invention is directed to a composition comprising an oil-in-water emulsion or microemulsion in which the oil phase contains an organosiloxane possessing at least one alkoxy group and at least one organosilane.

BRIEF DESCRIPTION OF THE DRAWING

FIG. 1 is a graphical representation of the amount of crude oil passed by wicking.

FIG. 2 is a picture showing the wicking process in accordance with the Examples.

DETAILED DESCRIPTION OF THE INVENTION

In the specification and claims herein, the following terms and expression are to be understood as having the hereinafter indicated meanings.

The singular forms "a," "an" and "the" include the plural, and reference to a particular numerical value includes at least that particular value unless the context clearly dictates otherwise.

All methods described herein may be performed in any suitable order unless otherwise indicated herein or otherwise clearly contradicted by context. The use of any and all examples or exemplary language (e.g., "such as") provided herein is intended merely to better illuminate the invention and does not pose a limitation on the scope of the invention unless otherwise claimed.

No language in the specification should be construed as indicating any non-claimed element as essential to the practice of the invention.

As used herein, the terms "comprising," "including," "containing," "characterized by" and grammatical equivalents thereof are inclusive or open-ended terms that do not exclude additional, unrecited elements or method steps, but will also be understood to include the more restrictive terms "consisting of" and "consisting essentially of."

Composition percentages are given in weight percent unless otherwise indicated.

It will be understood that any numerical range recited herein includes all sub-ranges within that range and any combination of the various endpoints of such ranges or sub-ranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The expression "hydrocarbon group" means any hydrocarbon compound from which one or more hydrogen atoms has been removed and is inclusive of alkyl, alkenyl, alkynyl, alkylene, cyclic alkyl, cyclic alkenyl, cyclic alkynyl, aryl, aralkyl and arenyl and may contain one or more heteroatoms.

The term "heteroatom" means any of the Group 13-17 elements except carbon and includes, for example, oxygen, nitrogen, silicon, sulfur, phosphorus, fluorine, chlorine, bromine and iodine.

The term "alkyl" means any monovalent, saturated straight, branched or cyclic hydrocarbon group; the term "alkenyl" means any monovalent straight, branched, or cyclic hydrocarbon group containing one or more carbon-carbon double bonds where the site of attachment of the group can be either at a carbon-carbon double bond or elsewhere therein; and, the term "alkynyl" means any monovalent straight, branched, or cyclic hydrocarbon group containing one or more carbon-carbon triple bonds and, optionally, one or more carbon-carbon double bonds, where the site of attachment of the group can be either at a carbon-carbon triple bond, a carbon-carbon double bond or elsewhere therein. Examples of alkyls include methyl, ethyl, propyl and isobutyl. Examples of alkenyls include vinyl, propenyl, allyl, methallyl, ethylidenyl norbornane, ethylidene norbornyl, ethylidenyl norbornene and ethylidene norbornenyl. Examples of alkynyls include acetylenyl, propargyl and methylacetylenyl.

The expressions "cyclic alkyl", "cyclic alkenyl", and "cyclic alkynyl" include bicyclic, tricyclic and higher cyclic structures as well as the aforementioned cyclic structures further substituted with alkyl, alkenyl, and/or alkynyl groups. Representative examples include norbornyl, norbornenyl, ethylnorbornyl, ethylnorbornenyl, cyclohexyl, ethylcyclohexyl, ethylcyclohexenyl, cyclohexylcyclohexyl and cyclododecatrienyl.

The term "aryl" means any monovalent aromatic hydrocarbon group; the term "aralkyl" means any alkyl group (as defined herein) in which one or more hydrogen atoms have been substituted by the same number of like and/or different aryl (as defined herein) groups; and, the term "arenyl" means any aryl group (as defined herein) in which one or more hydrogen atoms have been substituted by the same number of like and/or different alkyl groups (as defined herein). Examples of aryls include phenyl and naphthalenyl. Examples of aralkyls include benzyl and phenethyl. Examples of arenyls include tolyl and xylyl.

Useful hydrocarbyl groups include alkyl groups examples of which are methyl, ethyl, n-propyl, isopropyl, n-butyl, isobutyl, tert-butyl, n-pentyl, isopentyl, neopentyl and tert-pentyl; hexyl such as n-hexyl; heptyl such as n-heptyl; octyl such as n-octyl, isooctyl and 2,2,4-trimethylpentyl; nonyl such as n-nonyl; decyl such as n-decyl; and cycloalkyl, such as cyclopentyl, cyclohexyl, cycloheptyl and methylcyclohexyl. Examples of alkenyl groups include vinyl, propenyl, allyl, methallyl, cyclohexenyl, norbornenyl, ethylnorbornenyl, ethylidenyl norbornane, ethylidene norbornyl, ethylidenylnorbornene and ethylidene norbornenyl. Examples of alkynyl groups include acetylenyl, propargyl and methylacetylenyl. Examples of aryl groups include phenyl, naphthyl; o-, m- and p-tolyl, xylyl, ethylphenyl and benzyl.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

The terms "relative permeability modifier (RPM)" and "water shut-off" refer to materials and compositions that have the ability to selectively alter the permeability of a siliceous formation or rock for oil, gas and water. RPM is generally used to create a high and extended relative permeability for oil and gas so that their production can be increased and the production of water can be reduced.

The expression "water penetrating-inhibiting amount of a water penetrating-inhibiting composition" shall be understood to mean that amount of water penetrating-inhibiting composition in accord with the invention when introduced into a hydrophobic hydrocarbon fluid-bearing formation results in a significant increase in the hydrophobicity of the siliceous material in the formation as measured by the wettability index of the treated formation as calculated by using the following formula:

$$\text{Wettability Index } (Sw) = \frac{m_{sw} - m_{sw=0}}{m_{sw=1} - m_{sw=0}}$$

where $m_{sw}$=weight of the core after water pickup, $m_{sw=0}$=weight of dry core, and $m_{sw=1}$=weight of saturated core ($m_w$=$m_{sw=1}$).

The terms "emulsion" and "microemulsion" refer to an emulsion system which is a two-immiscible phase system stabilized by emulsifiers and in which the oil phase generally carries the organosiloxane and optional organosilane components. The emulsion or microemulsion releases the organosiloxane and optional organosilane upon dilution and heating in water or brine. As gas/oil well temperatures vary from 90-200° C., the emulsions and microemulsions herein provide an effective source of organosiloxane and optional organosilane.

The organosiloxane emulsion can be readily diluted with brine such as 0.5% aqueous NaCl or brine, preferably to 5-10 weight percent, more preferably to 1-5 weight percent and even more preferably to 0.1-1 weight percent. The diluted solutions can be directly injected into the oil and gas wells whereby the organosiloxane and optional organosilanes are released for reaction with surface hydroxyl groups on siliceous materials.

In the method of the present invention, the organosiloxane compound can be dispersed or dissolved in a hydrocarbon solvent such as Isopar M™ (Exxon Mobil), diesel, hexanes, xylenes, toluene, naphtha, petroleum distillate, methyl soyate, biodiesel, and the like, and applied to siliceous formations by injecting the said dispersion. The organosiloxane compounds can be readily dispersed or solubilized in the selected hydrocarbon solvent(s) preferably to 5-10 weight percent, more preferably to 1-5 weight percent, even more preferably to 0.1-1 weight percent concentration.

The term "brine" refers to a solution of water and electrolytes such as sodium chloride, potassium chloride, calcium chloride, and the like.

The term "connate brine" refers to a solution of water and electrolyte such as sodium chloride, calcium chloride, magnesium chloride, sodium bicarbonate, sodium sulfate, and the like. In general, connate brine refers to water trapped in rocks/formations for several thousand years and carrying a high content of dissolved electrolyte.

The term "formation surface" or "surface" refers to the internal area of the channels or pores or external surface exposed to oil/gas and brine or connate water.

The term "siliceous" refers to a substance having the characteristics of silica and is inclusive of silicates and aluminosilicates.

The term "subterranean formation" or "formation" refers to the rocks which may lie beneath the earth's external surface or under the sea bed off shore that have trapped oil and/or gas. In general, oil and gas formations, or reservoirs, may be located in a range of from a few hundred feet (shallow well) to ten thousand feet or more (ultra-deep well).

"Sandstone rocks" are rocks consisting of sand-size particles. Sandstone rocks are also known as siliceous rocks due to the presence of silica (silicon dioxide, quartz) therein.

The term "halite" refers to rock salt or sodium chloride. "Halite inhibition" occurs when a particular method or process or chemical or additive prevents or impedes crystallization or deposition of halite onto the said surface of formation materials or structures. Such chemicals or additives are referred to as "halite inhibitors".

The term "surface modification" refers to a process whereby an external chemical, reagent or additive is applied to the surface of a material resulting in a change in the material's chemical and/or physical properties.

The term "wettability" is defined as the ability of a particular substrate to be wetted by water or oil and can be categorized as "water-wet" and "oil-wet", respectively.

The term "hydrophilic" refers to a water-loving surface and materials having such a surface.

The term "hydrophobic" refers to a water-repellent surface and materials having such a surface. Converting an initially hydrophilic surface to a hydrophobic surface is referred to as "hydrophobization".

The term "contact angle" refers to the angle measured through the liquid where the liquid interface meets the solid surface.

The term "treatment" refers to changing the condition of a subterranean formation surface or a well which may be a part of wellbore by applying an external composition one or more components of which can deposit upon the surface of hydrophilic materials by rendering them hydrophobic.

The term "permeability" is defined as the ability of materials to allow oil and/or gas to flow therethrough. High permeability (>30 mD) of a formation indicates that fluid/gas can readily pass therethrough; low permeability of a formation (<10mD) indicates that fluid/gas does not readily pass therethrough.

The term "porosity" as applied to a rock, e.g., siliceous rock that is characteristic of a subterranean hydrocarbon-bearing formation, is defined as the measure of the ability of the rock to hold fluid, e.g., oil or gas.

The present invention provides a method and composition for treating a siliceous subterranean hydrocarbon-bearing formation to render its siliceous material more hydrophobic. The method can be carried out by the use of oganosiloxane alone or a mixture of organosiloxane and optional organosilane.

The method can be applied employing a water-based emulsion or microemulsion or hydrocarbon solvent-based dispersion or solution of the silicon active(s). Suitable examples of hydrocarbon solvents are Isopar M, diesel, hexanes, xylenes, toluene, naphtha, petroleum distillate, methyl soyate, silicone oil and biodiesel.

In one embodiment, the method of the invention is used for halite inhibition wherein a decrease in well temperature and pressure would otherwise leave halite deposited in the pores or channels of the oil/gas-producing subterranean formation.

In another embodiment, the method of the invention is used for water shut-off wherein excess production of brine or water would otherwise impede the production of oil/gas.

In yet another embodiment, the method of the invention is used for improving the permeability of a subterranean formation.

In still another embodiment, the method of the invention is used to modify the wettability of a subterranean formation.

In one embodiment, the organosiloxane component of the water penetration-inhibiting composition is of the general formula:

$$M_xD_yT_zQ_k$$

wherein
$M=R^1R^2R^3SiO_{1/2}$;
$D=R^4R^5SiO_{2/2}$;
$T=R^6SiO_{3/2}$; and,
$Q=SiO_{4/2}$;
wherein $R^1$, $R^2$, $R^3$, $R^4$, $R^5$ and $R^6$ each independently is a monovalent hydrocarbon group having from 1 to 20 carbon atoms and optionally containing at least one heteroatom, or an $OR^7$ group in which $R^7$ is hydrogen or a monovalent hydrocarbon group having from 1 to 20 carbon atoms and optionally containing at least one heteroatom and/or hydroxyl group, with the proviso that at least one $OR^7$ group is present; x is 1 to 50; y is 1 to 400; z is 0 to 20; and, k is 0 to 10, subject to the limitation that z+k>0.

In another embodiment, the organosiloxane used in the method of the present invention is of the general formula:

$$R^8Me_2SiO(SiMe_2O)_a(SiR^9R^{10}O)_bSiMe_2R^8$$

wherein $R^8$ and $R^9$ each independently is hydrogen, a hydroxyl group, an alkoxy group such as methoxy, ethoxy or propoxy, a vinyl group or a monovalent hydrocarbon group having from 1 to 20 carbon atoms and optionally containing at least one heteroatom; $R^{10}$ is $(CH_2)_3NH(CH_2)_2NH_2$, $(CH_2)_3NH_2$, $(CH_2)_2CF_3$ or a monovalent hydrocarbon group having from 1 to 20 carbon atoms; a is 3 to 2500; and, b is 1 to 460, with the proviso that at least one alkoxy group is present.

Specific examples of the organosiloxane component of the water penetration-inhibiting composition herein are 3-[(2-aminoethyl)-aminopropyl]-polydimethylsiloxanes such as $(CH_3)_2(OCH_3)Si[OSi(CH_3)_2]_x[OSi(CH_3)R^{10}]_yOSi(CH_3)_2(OCH_3)$ wherein $R^{10}$ is $H_2NCH_2CH_2NH(CH_2)_3$—; aminopropyl-polydimethylsiloxanes such as $(CH_3)_2(OCH_3)Si[OSi(CH_3)_2]_x[OSi(CH_3)R^{10}]_yOSi(CH_3)_2(OCH_3)$ wherein $R^{10}$ is $H_2N(CH_2)_3$—; and 3,3,3-trifluoropropyl-polydimethylsiloxanes such as $(CH_3)_2(OCH_3)Si[OSi(CH_3)_2]_x[OSi(CH_3)R^{10}]_yOSi(CH_3)_2(OCH_3)$ wherein $R^{10}$ is $F_3C(CH_2)_3$—.

In one embodiment of the invention, the organosiloxane is present in the water penetration-inhibiting composition as an oil-in-water emulsion or microemulsion in which the oil phase includes one or more liquid hydrocarbons such as Isopar M, diesel, hexanes, xylenes, toluene, naphtha, petroleum distillate, methyl soyate, silicone oil, biodiesel and, the like. Such emulsions/microemulsions can be readily prepared by methods well known in the art. The amount of organosiloxane in the emulsion or microemulsion can vary considerably, for example, from 10-80, and preferably from 20 to 60, percent by weight. Suitable examples of emulsifiers are typically linear and branched alcohol ethoxylates, sorbitan ethoxylates, octylphenol ethoxylates, nonylphenol ethoxylates, ethoxylated seed oil such as castor oil, and the like. Such emulsifiers can be added in 0.5-10 weight percent of the total weight of emulsion.

The aforementioned emulsion or microemulsion can be further diluted with water or brine before application to provide a concentration of the organosiloxane of, for example, from 0.1-33, preferably from 0.1-10, more preferably from 0.1-5 and most preferably from 0.1-1, weight percent.

In another embodiment of the invention, the organosiloxane is present in the water penetration-inhibiting composition as an organic solvent solution. Suitable organic solvents include Isopar M, diesel fuel, hexanes, xylenes, toluene, naphtha, petroleum distillate, methyl soyate, and biodiesel, the amount of organosiloxane dissolved therein varying over fairly wide limits, for example, from 1 to 33, and advantageously from 0.1 to 5, weight percent based on the entire weight of the solution including any optional components such as the adhesion-enhancing organosilanes discussed and listed below.

In yet another embodiment of the invention, the water penetration-inhibiting composition optionally includes an organosilane to enhance the adhesion between the organosiloxane and the subterranean formation, potentially providing a more durable modification of the formation wettability through stronger or more extensive bonding to the formation. The alkoxy groups of certain organosilanes can be hydrolyzed to yield silanol groups (which have an affinity for the siliceous formation), while the organic groups themselves can interact with organic polymers, including organofunctional siloxanes and polydimethylsiloxanes. Enhanced binding of the organosiloxane to the formation may extend the durability of the treatment as the formation produces hydrocarbons. Useful organosilanes include those of the formula:

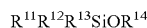

wherein $R^{11}$, $R^{12}$ and $R^{13}$ each independently is $OR^{14}$ or monovalent hydrocarbon group, optionally containing heteroatoms and/or hydroxyl groups, having from 1 to 20 carbon atoms; and, $R^{14}$ is a monovalent hydrocarbon radical, optionally containing one or more heteroatoms, having from 1 to 20 carbon atoms.

The amount of optional organosilane present in the water penetration-inhibiting composition can vary widely, for example, from 0.1 to 20, and preferably from 0.1 to 10, weight percent thereof.

Suitable organosilanes of the foregoing formula that can be used herein include methyltriethoxysilane, dimethyldiethoxysilane, methyltrimethoxysilane, divinyldimethoxysilane, divinylmethoxyethoxysilane, di(3-glycidoxypropyl)dimethoxysilane, vinyltriethoxysilane, vinyltris-2-methoxyethyoxysilane, 3-glycidoxypropyl-tri-methoxysilane, 3-methacryloxypropyltrimethoxysilane, 2-(3,4-epoxycyclohexyl)ethyl-trimethoxysilane, N-2-aminoethyl-3-propylmethyldimethoxysilane, N-2-aminoethyl-3-propyltrimethoxysilane, N-2-aminoethyl-3-aminopropyltriethoxysilane, 3-aminopropyltriethoxysilane, octyltriethoxysilane, tetraethoxysilane, triethoxysilylpropoxy(hexaethyleneoxy)dodecanoate, triethoxysilylpropoxy(triethyleneoxy)octadecanoate, tridecafluorooctyltriethoxysilane and heptadecafluorodecyltrimethoxysilane.

In an embodiment of the invention, the water penetration-inhibiting composition contains from 0.1 to 33 weight percent of the organosiloxane and from 0.1 to 20 weight percent organosilane. In another embodiment, the water penetration-inhibiting composition contains from 0.1 to 10 weight percent organosiloxane and from 0.1 to 10 weight percent organosilane.

In one embodiment, the siliceous hydrocarbon-bearing subterranean formation is primarily sandstone, many kinds of which have a silica content ranging from 18 to 99 weight percent.

The present invention provides a method for treating oil and gas producing siliceous subterranean formations to reduce water production. The method is useful for halite inhibition, water shut-off and relative permeability alteration. The experimental data from treated and untreated siliceous cores discussed below indicate that the flow of brine in the pores of the cores decreases when pre-treated with the water penetration-inhibiting composition of the invention. As a result, deposition of halite in the pores of sandstone rocks is significantly decreased. The experimental data herein also indicates that the flow of oil via the cores increases significantly suggesting that permeability for oil is considerably improved by the method of the invention while permeability for water or brine is considerably decreased.

In general, treatment of a particular oil/gas formation with the water penetration-inhibiting composition herein is carried out after evaluation of such properties of the formation as its hydrophobicity, hydrophilicity, porosity and uniaxial compressive strength employing procedures well known in the art. Once the operator gathers the desired data regarding the characteristics of the formation, the water penetration-inhibiting composition, advantageously in the form of an emulsion or microemulsion or in the form of an organic solvent solution, is injected into the formation, for example, through a wellbore. Injection of the water penetration-inhibiting composition into the siliceous formation to be treated can be carried out continuously or intermittently over a period of time, e.g., 24 hours to 3 days, with the objective of delivering an amount of such composition that is sufficient to measurably increase the hydrophobicity of the siliceous material in the treated region. It will be readily appreciated by those skilled in the art that the total amount of water penetration-inhibiting composition needed to achieve this objective will be made to depend on such factors as the concentration of polysiloxane in the composition, the amount of any optional adhesion promoting organosilane therein, the silica content of the siliceous region of the formation to be treated the porosity of such region and its permeability characteristics. These variables can be readily quantified employing known and conventional techniques and testing procedures. In general, the total amount of a given water penetration-inhibiting composition to be introduced into a particular siliceous hydrocarbon fluid-bearing subterranean formation can be determined within a useful degree of precision utilizing the Wettability Index (Sw) measurement method described below.

Wettability Index measurement provides a numerical value related to the hydrophilic or hydrophobic characteristic of a material, in this case, the hydrophilic character of a siliceous subterranean hydrocarbon fluid-containing formation prior to treatment with the water penetration-inhibiting composition herein, and expressed as a reference value of approximately 1, and the hydrophobic character of the formation following such treatment, expressed as a measurable decrease in such reference value.

In general, an amount of water penetration-inhibiting composition will be introduced into the siliceous subterranean hydrocarbon fluid-containing formation that will reduce its wettability index from an initial reference index value of approximately 1 to a wettability index of not greater than 0.80, preferably not greater than 0.60, still more preferably not greater than 0.40 and most preferably not greater than 0.20.

Another embodiment of the invention is directed to a composition comprising an oil-in-water emulsion or microemulsion in which the oil phase contains an organosiloxane possessing at least one alkoxy group and at least one organosilane.

In such a composition, the organosiloxane can be of the general formula:

$$M_x D_y T_z Q_k$$

wherein
$M = R^1 R^2 R^3 SiO_{1/2}$;
$D = R^4 R^5 SiO_{2/2}$;
$T = R^6 SiO_{3/2}$; and,
$Q = SiO_{4/2}$ wherein $R^1$, $R^2$, $R^3$, $R^4$, $R^5$ and $R^6$ each independently is a monovalent hydrocarbon group having from 1 to 20 carbon atoms optionally containing at least one heteroatom, or an $OR^7$ group in which $R^7$ is hydrogen or a monovalent hydrocarbon group having from 1 to 20 carbon atoms optionally containing at least one heteroatom and/or hydroxyl group, with the proviso that at least one $OR^7$ group is present; x is 1 to 50; y is 1 to 400; z is 0 to 20; and, k is 0 to 10, subject to the limitation that z+k>0.

In another embodiment of the composition, the organosiloxane can be of the general formula:

$$R^8 Me_2 SiO(SiMe_2O)_a(SiR^9R^{10}O)_b SiMe_2 R^8$$

wherein $R^8$ and $R^9$ each independently is hydrogen, a hydroxyl group, an alkoxy group such as methoxy, ethoxy or propoxy, a vinyl group or a monovalent hydrocarbon group having from 1 to 20 carbon atoms and radical, optionally containing at least one heteroatom; $R^{10}$ is $(CH_2)_3NH(CH_2)_2NH_2$, $(CH_2)_3NH_2$, $(CH_2)_2CF_3$ or a monovalent hydrocarbon group having from 1 to 20 carbon atoms; a is 3 to 2500; and, b is 1 to 460; with the proviso that at least one alkoxy group is present.

In yet another embodiment of the composition, the organosiloxane can be selected from the group consisting of 3-[(2-aminoethyl)-aminopropyl]-polydimethylsiloxanes, aminopropyl-polydimethylsiloxanes and 3,3,3-trifluoropropyl-polydimethylsiloxanes, and mixtures thereof.

In yet another embodiment of the composition, the organosiloxane can be selected from the group consisting of $(CH_3)_2(OCH_3)Si[OSi(CH_3)_2]_x[OSi(CH_3)R^{10}]_yOSi(CH_3)_2(OCH_3)$ wherein $R^{10}$ is $H_2NCH_2CH_2NH(CH_2)_3-$, $(CH_3)_2(OCH_3)Si[OSi(CH_3)_2]_x[OSi(CH_3)R^{10}]_yOSi(CH_3)_2(OCH_3)$, wherein $R^{10}$ is $H_2N(CH_2)_3-$, and $(CH_3)_2(OCH_3)Si[OSi(CH_3)_2]_x[OSi(CH_3)R^{10}]_yOSi(CH_3)_2(OCH_3)$ wherein $R^{10}$ is $F_3C(CH_2)_3-$.

In yet another embodiment of the composition, the organosilane can be selected from the group consisting of methyltriethoxysilane, dimethyldiethoxysilane, methyltrimethoxysilane, divinyldimethoxysilane, divinylmethoxyethoxysilane, di(3-glycidoxypropyl)dimethoxysilane, vinyltriethoxysilane, vinyltris-2-methoxyethyoxysilane, 3-glycidoxypropyl-tri-methoxysilane, 3-methacryloxypropyltrimethoxysilane, 2-(3,4-epoxycyclohexyl)ethyl-trimethoxysilane, N-2-aminoethyl-3-propylmethyldimethoxysilane, N-2-aminoethyl-3-propyltrimethoxysilane, N-2-aminoethyl-3-aminopropyltriethoxysilane, 3-aminopropyltriethoxysilane, octyltriethoxysilane, tetraethoxysilane, triethoxysilylpropoxy(hexaethyleneoxy)dodecanoate, triethoxysilylpropoxy(triethyleneoxy)octadecanoate, tridecafluorooctyltriethoxysilane, heptadecafluorodecyltrimethoxysilane, and mixtures thereof.

The method of the invention is illustrated in the examples that follow.

Sample Preparation Procedure

In the examples set forth below, a sandstone, i.e., siliceous core, was subjected to a vacuum of 40 torr for 2 hours. The core was then placed in water or connate water in a pressure cell and the cell was placed in an oven for 24 h at 90° C./1 atm P. After cooling, the saturated core was weighed ($m_1$), dried at 90° C. for 24h in an oven and weighed ($m_0$). The wicking test was then performed on this pretreated core as described below. The reference wettability index $(Sw)_{ref}$ of the pretreated core was calculated using the following formula wherein $m_w$ represents the weight of core after water pick-up at the end of wicking test:

$$\text{Wettability Index } (Sw)ref = \frac{m_w - m_0}{m_1 - m_0}$$

$m_w$=weight of the core after water pickup;
$m_0$=dried core weight;
$m_1$=weight of saturated core The pretreated core was then treated with the desired water penetration-inhibiting composition containing organosiloxane and/or silane in water or 0.5% NaCl or organic solvent at 90° C./1 atm pressure for 24 hours. The core was then removed from the pressure cell and dried at 90° C. for 24 h in an oven and weighed ($m_{sw=0}$). After that, the wicking test was performed (FIG. 2) and the wettability index was calculated using the following formula.

$$\text{Wettability Index } (Sw) = \frac{m_{sw} - m_{sw=0}}{m_{sw=1} - m_{sw=0}}$$

where $m_{sw}$=weight of the core after water pickup, $m_{sw=0}$=weight of dry core, and $m_{sw=1}$=weight of saturated core ($m_w$=$m_{sw=1}$:$m_w$ values from pretreatment step were used as $m_{sw=1}$. Each core was pretreated prior to treating water penetration-inhibiting composition containing organosiloxane and/or silane.

Wicking Test

The wicking test was performed on the treated and untreated sandstone cores by using the following procedure: (1) wrapping the core with dry filter paper (~1" larger than the length of core); (2) fixing the filter paper to the core; (3) placing the filter paper-wrapped core in an upright position in a Petri dish containing connate water so that only the filter paper, and not the core, is in direct contact with the water; (4) allowing wicking to take place for 24 hours; and, (5) measuring the weight of the core and calculating the wettability index as described above. A representative picture showing wicking is shown in FIG. 2.

Contact angles were measured on a Rame Hart Advanced Goniometer (Model 500-F1) by using 4 µL of distilled water for each drop and 3 second measurement time. The measurement was repeated for 15 times on the same core. The average of contact angles is reported in Table 2 below.

After the wettability index measurement procedure was completed, the cores were used to measure oil and gas permeability, water shut-off and halite inhibition. Connate water was prepared by dissolving NaCl (150.4 g/L), $CaCl_2.2H_2O$ (69.8 g/L), $MgCl_2.6H_2O$ (20.4 g/L), $Na_2SO_4$ (0.52 g/L), and $NaHCO_3$ (0.49 g/L) (Ref: SPE 168069). Berea sandstone cores from Kocurek Industries (gas permeability=200-315 millidarcy (mD), brine permeability=60-

100 mD, porosity=19-20%, uniaxial compressive strength (UCS)=7,000-10,100 psi) were used herein.

EXAMPLE 1

Hydrophobization Treatment of Sandstone Cores

The hydrophobization treatment of the Berea sandstone cores was performed using the general method described above. The treatment solvent was prepared by dissolving 1 wt % of the formulation (1-6) in the desired solvent (Table-1). The wettability index (Sw) values of the cores decreased after treatment employing the method of the invention (Table-1). Contact angle measurements were performed on dry cores (90° C., 24 h) and 7 days aged cores in 65% relative humidity. The contact angle data revealed the hydrophobic character of the siliceous core material (Table 2). Below are the details of formulations used for the treatment of sandstone cores:

Formulation-1: Formulation-1 was a 30-40 wt % emulsion of an organosiloxane with the formula $\{[MeSiO_{3/2}]_{0.8}[Me(C_{12-18}H_{25-37})SiO]_{0.2}[O_{1/2}CH_3]_{0.8}\}_x$ in water.

Formulation-2: Formulation-2 was a 30-40 wt % emulsion of an organosiloxane with the formula $\{[MeSiO_{3/2}]_{0.8}[Me(C_{12-18}H_{25-37})SiO]_{0.2}[O_{1/2}CH_2CH_3]_{0.8}\}_x$ and 30-40 wt % organosilane with the formula $C_{8-14}H_{17-29}Si(OCH_2CH_3)_3$ in water.

Formulation-3: Formulation-3 represents an organosiloxane with the formula $\{[MeSiO_{3/2}]_{0.8}[Me(C_{12-18}H_{25-37})SiO]_{0.2}[O_{1/2}CH_3]_{0.8}\}_x$.

Formulation-4: Formulation-4 represents an organosiloxane with the formula $\{[MeSiO_{3/2}]_{0.8}[Me(C_{12-18}H_{25-37})SiO]_{0.2}[O_{1/2}CH_2CH_3]_{0.8}\}_x$.

Formulation-5: Formulation-5 represents a blend of 91 wt % of Formulation-1 and 9 wt % aminopropyltriethoxysilane.

Formulation-6: Formulation-6 represents a blend of 91 wt % of Formulation-2 and 9 wt % aminopropyltriethoxysilane.

TABLE 1

Treatment Details and Wettability Index Data

| Sandstone Core No. | Formulation #, wt % | Pre-treatment Solvent | Treatment Solvent | Wettability Index (Sw) |
|---|---|---|---|---|
| 1 | Formulation-1, 1 wt % | water | water | 0.30 |
| 2 | Formulation-1, 1 wt % | connate water | 0.5% aq NaCl | 0.26 |
| 3 | Formulation-2, 1 wt % | water | water | 0.32 |
| 4 | Formulation-2, 1 wt % | connate water | 0.5% aq NaCl | 0.09 |
| 5 | Formulation-3, 1 wt % | water | Isopar M | 0.35 |
| 6 | Formulation-3, 1 wt % | connate water | Isopar M | 0.35 |
| 7 | Formulation-4, 1 wt % | water | Isopar M | 0.35 |
| 8 | Formulation-4, 1 wt % | connate water | Isopar M | 0.59 |
| 9 | Formulation-5, 1 wt % | connate water | water | 0.15 |
| 10 | Formulation-6, 1 wt % | connate water | water | 0.10 |
| 11 | none | connate water | 0.5% aq NaCl | 0.99* |

*Average value of six wettability index measurements.

TABLE 2

Contact Angle Data of Treated Sandstone Cores

| Sandstone Core No. | Water Contact Angle (°) (Std Dev, σ); (initial) | Water Contact Angle (°) (Std Dev, σ); (7 day aged cores at 65% relative humidity) |
|---|---|---|
| 2 | 116.3 (9.8) | 107.9 (6.2) |
| 4 | 92.5 (13.9) | 91.0 (10.5) |
| 6 | 86.5 (5.9) | 88.7 (3.9) |
| 8 | 86.7 (7.9) | 83.9 (4.7) |
| 11 | ≤0 (drop absorbed into core in <3 seconds) | ≤0 (drop absorbed into core in <3 seconds) |

EXAMPLE 2

Halite Inhibition and Water Shutoff Tests.

In these experiments, halite inhibition and water shut-off were measured by permitting saturated aqueous sodium chloride solution to pass via the pores of the sandstone core. In a typical method, the sandstone core was installed in a glass jar approximately halfway from each side. The glass jar was then filled with saturated sodium chloride and sealed. The brine was then allowed to evaporate at room temperature at atmospheric pressure. After two months the treated cores (Nos. 2, 4, 6 and 8) showed no or insignificant deposit of sodium chloride crystals on the exposed part of the treated core. In contrast to these results, untreated sandstone Core No. 11 allowed brine to move up and allow sodium chloride to deposit thereon. These runs suggested negative capillary forces for organosiloxane-treated cores, as a result of which brine flow within the core was inhibited (Example 3).

EXAMPLE 3

Oil and Water Flow Measurements.

To further demonstrate improved permeability of cores employing the method of the invention, experiments were carried out which involved oil wicking via the pores of cores with oil that passed via the cores being absorbed onto pre-weighed Kimtech Kimwipes (Kimberly-Clark). In these experiments, the paper tissue was changed every hour and weighed (for a total of 7 experiments) with the total amount of the oil passed via the core then being calculated (FIG. 1). The data clearly shows that the organosiloxane-treated cores allowed more oil to pass as 82% and 101% more oil to pass via Core Nos. 2 and 6 as compared to untreated Core Nos. 11 and 12, respectively (FIG. 1). In similar experiments, connate water was allowed to wick via the treated and untreated cores with the results showing that treated Core Nos. 2 and 4 allowed 56% and 8% less brine, respectively, to pass as compared to untreated Core No. 11.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

The invention claimed is:

1. A method for inhibiting penetration of water from a water-producing layer, section or zone located within, near or adjacent to a siliceous subterranean hydrocarbon fluid-bearing formation, wherein the siliceous subterranean hydrocarbon fluid-containing formation contains halide is in need of halite inhibition, into such formation, and which consists of introducing into the formation a water penetration-inhibiting amount of a water penetration-inhibiting composition comprising an organosiloxane possessing at least one alkoxy group directly bonded to a silicon atom, the organosiloxane reacting with the siliceous formation to decrease its hydrophilic character and increase its hydrophobic character thereby inhibiting the penetration of water into the hydrocarbon fluid-containing formation and also preventing or impeding crystallization or deposition of halite onto the surface of the formation.

2. The method of claim 1 wherein the organosiloxane is of the general formula:

$M_x D_y T_z Q_k$ wherein $M=R^1 R^2 R^3 SiO_{1/2}$;
$D=R^4 R^5 SiO_{2/2}$;
$T=R^6 SiO_{3/2}$; and,
$Q=SiO_{4/2}$ wherein $R^1$, $R^2$, $R^3$, $R^4$, $R^5$ and $R^6$ each independently is a monovalent hydrocarbon group having from 1 to 20 carbon atoms optionally containing at least one heteroatom, or an $OR^7$ group in which $R^7$ is hydrogen or a monovalent hydrocarbon group having from 1 to 20 carbon atoms optionally containing at least one heteroatom and/or hydroxyl group, with the proviso that at least one $OR^7$ group is present; x is 1 to 50; y is 1 to 400; z is 0 to 20; and, k is 0 to 10, subject to the limitation that z+k>0.

3. The method of claim 1 wherein the organosiloxane is of the general formula:

$R^8 Me_2 SiO(SiMe_2 O)_a (SiR^9 R^{10} O)_b SiMe_2 R^8$ wherein $R^8$ and $R^9$ each independently is hydrogen, a hydroxyl group, an alkoxy group, a vinyl group or a monovalent hydrocarbon group having from 1 to 20 carbon atoms and radical, optionally containing at least one heteroatom; $R^{10}$ is $(CH_2)_3 NH(CH_2)_2 NH_2$, $(CH_2)_3 NH_2$, $(CH_2)_2 CF_3$ or a monovalent hydrocarbon group having from 1 to 20 carbon atoms; a is 3 to 2500; and, b is 1 to 460; with the proviso that at least one alkoxy group is present.

4. The method of claim 1 wherein the organosiloxane is selected from the group consisting of $(CH_3)_2 (OCH_3) Si[OSi(CH_3)_2]_x [OSi(CH_3) R^{10}]_y OSi(CH_3)_2 (OCH_3)$ wherein $R^{10}$ is $H_2 NCH_2 CH_2 NH(CH_2)_3$-, $(CH_3)_2 (OCH_3) Si[OSi(CH_3)_2]_x [OSi(CH_3) R^{10}]_y OSi(CH_3)_2 (OCH_3)$, wherein $R^{10}$ is $H_2 N(CH_2)_3$-, and $(CH_3)_2 (OCH_3) Si[OSi(CH_3)_2]_x [OSi(CH_3) R^{10}]_y OSi(CH_3)_2 (OCH_3)$ wherein $R^{10}$ is $F_3 C(CH_2)_3$-.

5. The method of claim 1 wherein the water penetration-inhibiting composition is an oil-in-water emulsion or microemulsion in which the organosiloxane is present in the oil phase.

6. The method of claim 1 wherein the water penetration-inhibiting composition comprises an organic solvent solution of the organosiloxane.

7. The method of claim 1 wherein the water penetration-inhibiting composition is an oil-in-water emulsion or microemulsion in which an organic solvent solution of the organosiloxane is present in the oil phase.

8. The method of claim 1 wherein the water penetration-inhibiting composition further comprises an organosilane.

9. The method of claim 8 wherein the organosilane is selected from the group consisting of methyltriethoxysilane, dimethyldiethoxysilane, methyltrimethoxysilane, divinyldimethoxysilane, divinylmethoxyethoxysilane, di(3-glycidoxypropyl)dimethoxysilane, vinyltriethoxysilane, vinyltris-2-methoxyethyoxysilane, 3-glycidoxypropyl-tri-methoxysilane, 3-methacryloxypropyltrimethoxysilane, 2-(3,4-epoxycyclohexyl)ethyl-trimethoxysilane, N-2-aminoethyl-3-propylmethyldimethoxysilane, N-2-aminoethyl-3-propyltrimethoxysilane, N-2-aminoethyl-3-aminopropyltriethoxysilane, 3-aminopropyltriethoxysilane, octyltriethoxysilane, tetraethoxysilane, triethoxysilylpropoxy(hexaethyleneoxy)dodecanoate, triethoxysilylpropoxy(triethyleneoxy)octadecanoate, tridecafluorooctyltriethoxysilane, heptadecafluorodecyltrimethoxysilane, and mixtures thereof.

10. The method of claim 1 wherein the water penetration-inhibiting composition comprises from 0.1 to 33 weight percent of the organosiloxane.

11. The method of claim 1 wherein the water penetration-inhibiting composition comprises from 0.1 to 33 weight percent of the organosiloxane and from 0.1 to 20 weight percent organosilane.

12. The method of claim 1 wherein the total amount of water penetration-inhibiting composition introduced into the formation is sufficient to reduce the wettability index of a pre-treatment core sample of the formation from an initial reference value of approximately 1 to a post-treatment value of not greater than 0.60.

13. A composition comprising an oil-in-water emulsion or microemulsion in which the oil phase contains an organosiloxane possessing at least one alkoxy group and at least one organosilane.

14. The method of claim 1, wherein the formation is located from a few hundred feet to ten thousand feet beneath the earth' surface, or the surface of an offshore sea bed.

15. The method of claim 1, wherein the formation contains trapped oil and/or gas.

* * * * *